(12) United States Patent
Amano et al.

(10) Patent No.: US 11,300,016 B2
(45) Date of Patent: Apr. 12, 2022

(54) VALVE OPENING AND CLOSING TIMING CONTROL DEVICE

(71) Applicant: AISIN CORPORATION, Kariya (JP)

(72) Inventors: Hiroyuki Amano, Kariya (JP); Shogo Katsuki, Kariya (JP); Takano Nakai, Hiroshima-ken (JP); Kenichiro Suzuki, Hiroshima-ken (JP); Yoshiyuki Kamoyama, Hiroshima-ken (JP); Toru Hirota, Hiroshima-ken (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/204,988

(22) Filed: Mar. 18, 2021

(65) Prior Publication Data
US 2022/0003132 A1  Jan. 6, 2022

(30) Foreign Application Priority Data
Jul. 1, 2020  (JP) .............................. JP2020-114254

(51) Int. Cl.
| F01L 1/344 | (2006.01) |
| F02D 13/02 | (2006.01) |
| F01M 9/10  | (2006.01) |
| F01L 1/047 | (2006.01) |
| F01L 13/00 | (2006.01) |

(52) U.S. Cl.
CPC ............... *F01L 1/344* (2013.01); *F01L 1/047* (2013.01); *F01M 9/10* (2013.01); *F02D 13/02* (2013.01); *F01L 2013/11* (2013.01); *F01L 2820/044* (2013.01)

(58) Field of Classification Search
None
See application file for complete search history.

(56) References Cited

U.S. PATENT DOCUMENTS

| 2008/0066700 A1   | 3/2008  | Mashiki et al. |
| 2009/0088892 A1 * | 4/2009  | Shimizu ................... G05B 9/03 700/213 |
| 2010/0242880 A1   | 9/2010  | Watanabe et al. |
| 2013/0192549 A1 * | 8/2013  | Katoh ...................... F01L 1/344 123/90.15 |
| 2016/0169124 A1 * | 6/2016  | Hioka ................. F01L 13/0063 123/90.16 |
| 2019/0316497 A1 * | 10/2019 | Kakuda ................... F01L 1/344 |

* cited by examiner

*Primary Examiner* — Patrick Hamo
*Assistant Examiner* — Wesley G Harris
(74) *Attorney, Agent, or Firm* — Buchanan Ingersoll & Rooney PC (57) ABSTRACT

A valve opening and closing timing control device includes a drive-side rotating body that rotates synchronously with a crankshaft of an internal combustion engine, a driven-side rotating body that rotates with a camshaft of the internal combustion engine, an electric motor that controls a relative rotation phase of the drive-side rotating body and the driven-side rotating body, a motor control unit that controls a current supplied to the electric motor, a current sensor that detects the current flowing into the electric motor, a regulation unit that determines a regulation phase in which the relative rotation phase is mechanically limited in an advanced angle direction and in a delayed angle direction, and a regulation phase detection unit that detects the regulation phase based on when the relative rotation phase in which a change is stopped by the regulation unit is reached and a current value detected by the current sensor increases.

18 Claims, 9 Drawing Sheets

VALVE OPENING AND CLOSING TIMING CONTROL DEVICE

CROSS REFERENCE TO RELATED APPLICATIONS

This application is based on and claims priority under 35 U.S.C. § 119 to Japanese Patent Application No. 2020-114254, filed on Jul. 1, 2020, the entire content of which is incorporated herein by reference.

TECHNICAL FIELD

The present disclosure relates to a valve opening and closing timing control device.

BACKGROUND DISCUSSION

In the related art, a valve opening and closing timing control device that changes the opening/closing timing of an intake valve or an exhaust valve according to an operation condition of an internal combustion engine (hereinafter, also referred to as an "engine") has been put into practical use. This valve opening and closing timing control device controls the relative rotation phase between a drive-side rotating body that rotates synchronously with the crankshaft and a driven-side rotating body connected to the camshaft with an actuator to control the opening/closing timing of the valve. For example, when controlling the internal combustion engine, it is also necessary to control setting of the opening/closing timing to be the most delayed angle phase or the most advanced angle phase. JP 2010-229980 A describes a technique related to such control, and JP 2008-69719 A describes a technique for protecting equipment based on the temperature increase of the electric motor that controls the relative rotation phase.

JP 2010-229980 A describes a stopper determination unit that determines whether the valve timing variable mechanism is pressed to a limit position at which a stopper imposes restriction. In JP 2010-229980 A, phase angle feedback control is configured to determine that when the actuator operation amount is larger than the preset operation amount monitoring value for a predetermined time, the mechanism is pressed to the limit position at which a stopper imposes restriction.

JP 2008-69719 A describes a configuration in which a valve opening and closing timing control device (in JP 2008-69719 A, variable valve timing device) that controls the opening/closing timing (in JP 2008-69719 A, valve timing) by an electric motor detects the heating of the electric motor according to the operation state, so that the electric motor and the drive device can be protected and the control performance of the opening/closing timing can be prevented from deteriorating.

In order to reduce the compression ratio in each cylinder when the engine is started and enable cranking with a low load, control has been performed in the related art to set the opening/closing timing of the intake valve to the most delayed angle phase. Further, in order to obtain high output in the engine, control for setting the opening/closing timing of the intake valve to the most advanced angle phase has been performed in the related art.

However, the most delayed angle phase is the mechanical limit in the delayed angle direction of the relative rotation phases between the drive-side rotating body and the driven-side rotating body, and the most advanced angle phase is the mechanical limit in the advanced angle direction. Further, when the relative rotation phase of the valve opening and closing timing control device is set to an arbitrary phase, the relative rotation phase is controlled to be fed back by the sensor, but the detection result of the sensor includes an error.

Therefore, when controlling to set the relative rotation phase to the most delayed angle phase, the inconvenience occurs in which even in a situation where the relative rotation phase does not reach the most delayed angle phase, it is erroneously detected that the most delayed angle phase has been reached and control is stopped, or even in a situation where the relative rotation phase reaches the most delayed angle phase, it is erroneously detected that the most delayed angle phase has not been reached and the electric motor is continuously driven in the delayed angle direction.

A need thus exists for a valve opening and closing timing control device which is not susceptible to the drawback mentioned above.

SUMMARY

A valve opening and closing timing control device according to the present disclosure includes a drive-side rotating body that is rotatable around a rotation axis, and that rotates synchronously with a crankshaft of an internal combustion engine; a driven-side rotating body that is rotatable around the rotation axis, and that integrally rotates with a camshaft for opening and closing a valve of the internal combustion engine; an electric motor that controls a relative rotation phase of the drive-side rotating body and the driven-side rotating body; a motor control unit that controls a current supplied to the electric motor; a current sensor that detects the current flowing into the electric motor; a regulation unit that determines a regulation phase in which the relative rotation phase is mechanically limited in an advanced angle direction and in a delayed angle direction; and a regulation phase detection unit that detects the regulation phase based on when the relative rotation phase in which a change is stopped by the regulation unit is reached and a current value detected by the current sensor increases when controlling the relative rotation phase with the electric motor.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments of the present disclosure will be described with reference to the drawings.

[Basic Configuration]

Figure 1:
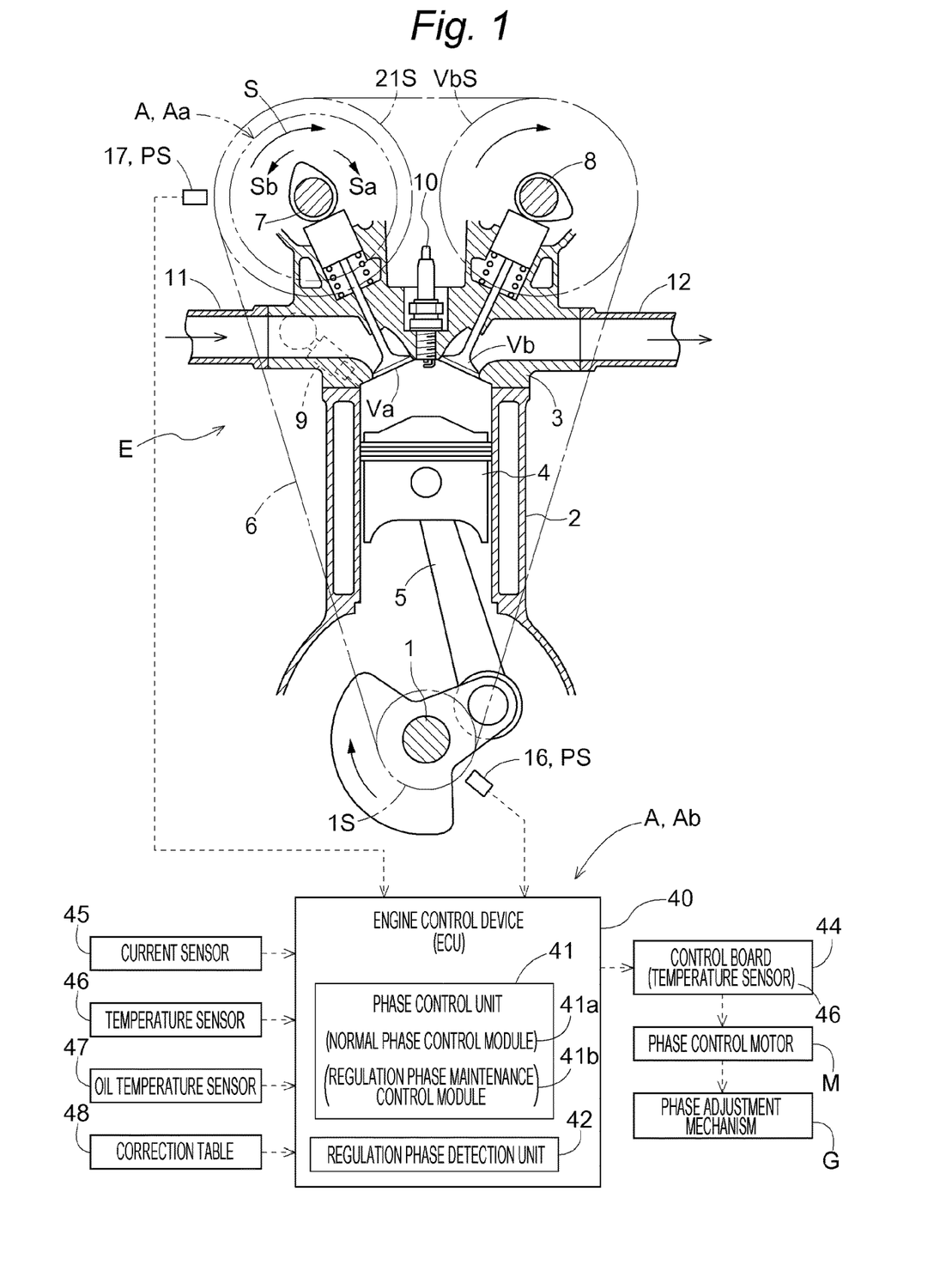
FIG. 1 is a diagram showing a cross section of an engine and a control device.

As shown in FIG. 1, an engine E as an internal combustion engine includes an intake valve Va and an exhaust valve Vb, and includes a valve opening and closing timing control device A for setting the valve timing (opening/closing timing) of the intake valve Va. This engine E (an example of an internal combustion engine) is provided in a vehicle in order to obtain a traveling driving force of a passenger car or the like.

The engine E is controlled by an engine control device 40, and the valve timing of the intake valve Va of the engine E is controlled by the valve opening and closing timing control device A. Specifically, the valve opening and closing timing control device A includes an operation body Aa configured by hardware that determines the valve timing of the intake valve Va by the driving force of a phase control motor M (an example of an electric motor), and a control unit Ab including software of the engine control device 40 that controls the phase control motor M.

Figure 2:
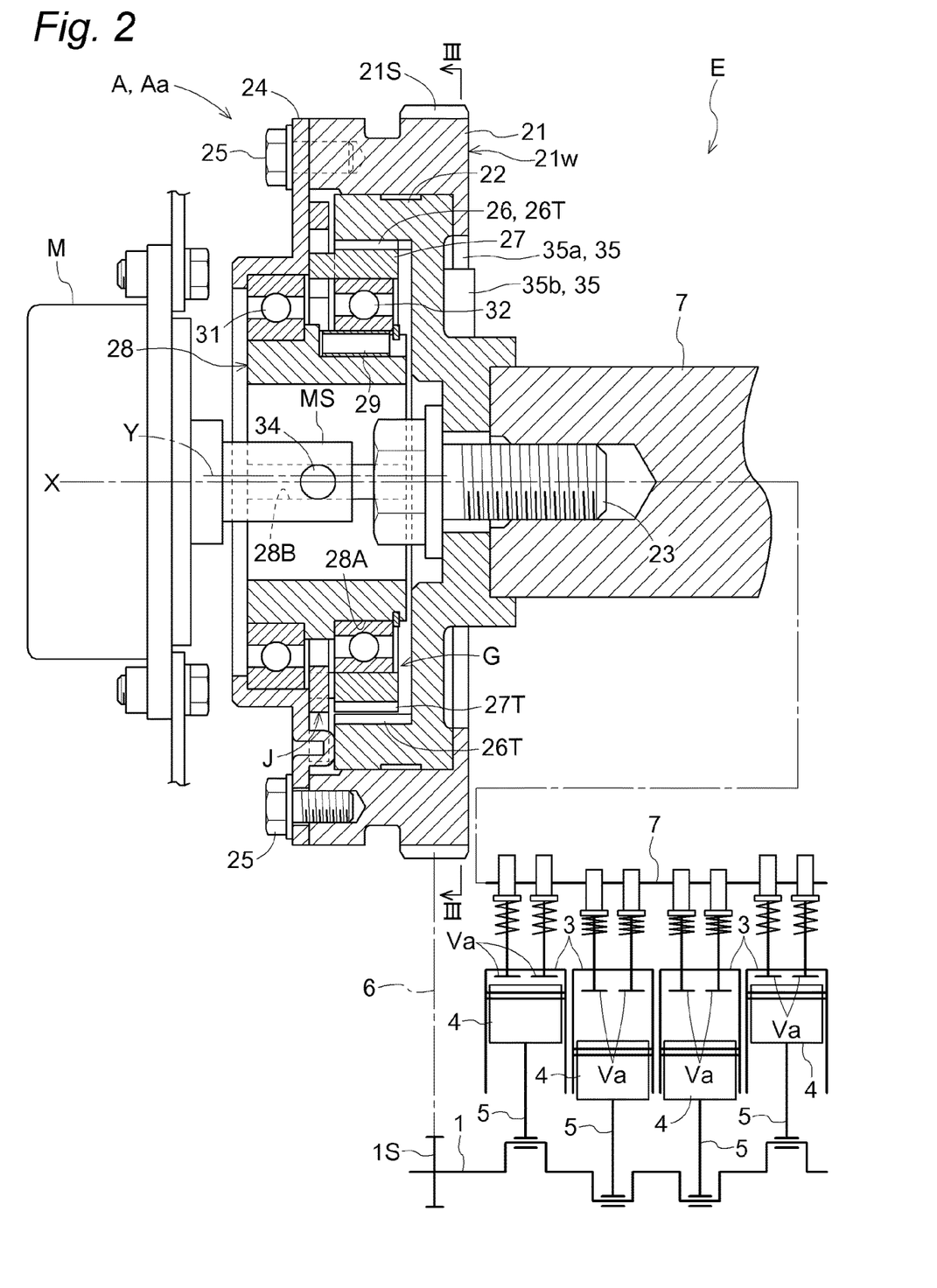
FIG. 2 is a cross-sectional view of the operation body of a valve opening and closing timing control device.

As shown in FIG. 2, the operation body Aa of the valve opening and closing timing control device A includes a drive case 21 (drive-side rotating body) and an internal rotor 22 (driven-side rotating body), and includes a phase adjustment mechanism G that changes the relative rotation phase between the drive case 21 and the internal rotor 22 (sometimes referred to simply as a "relative rotation phase" in the following description) by the driving force of the phase control motor M (an example of an electric motor). Further, the control unit Ab shown in FIG. 1 includes software that controls the valve timing of the intake valve Va by controlling the phase control motor M based on the signal of a phase sensor PS and the like of the engine control devices 40.

As shown in FIG. 1, the phase sensor PS includes a crank angle sensor 16 and a cam angle sensor 17. The crank angle sensor 16 also has a function of detecting the rotation angle of a crankshaft 1.

The relative rotation phase between the drive case 21 and the internal rotor 22 is a relative angle between the drive case 21 and the internal rotor 22 about a rotation axis X. In addition, the valve timing (opening/closing timing) of the intake valve Va changes by changing the relative rotation phase.

As shown in FIG. 1, the engine E has a configuration in which a cylinder head 3 is connected to the upper part of a cylinder block 2 that supports the crankshaft 1, a piston 4 is housed reciprocally movably in each of a plurality of cylinder bores formed in the cylinder block 2, and the piston 4 is connected to the crankshaft 1 by a connecting rod 5 to form a 4-cycle type.

The cylinder head 3 includes the intake valve Va and the exhaust valve Vb, and an intake camshaft 7 (an example of a camshaft for opening and closing the valve) that controls the intake valve Va and an exhaust camshaft 8 that controls the exhaust valve Vb are provided at the upper part of the cylinder head 3. Further, a timing belt 6 is wound across an output pulley 1S of the crankshaft 1, a driving pulley 21S of the operation body Aa, and an exhaust pulley VbS of the exhaust valve Vb.

The cylinder head 3 is provided with an injector 9 for injecting fuel into the combustion chamber and an ignition plug 10. An intake manifold 11 that supplies air to the combustion chamber via the intake valve Va and an exhaust manifold 12 that sends out the combustion gas from the combustion chamber via the exhaust valve Vb are connected to the cylinder head 3.

As shown in FIGS. 1 and 2, the crank angle sensor 16 capable of detecting the rotation angle is provided in the vicinity of the crankshaft 1, and the cam angle sensor 17 capable of detecting the rotation angle of the intake camshaft 7 is provided in the vicinity of the intake camshaft 7.

As described above, the phase sensor PS is composed of the crank angle sensor 16 and the cam angle sensor 17, and the crank angle sensor 16 and the cam angle sensor 17 are configured as a pickup type that intermittently outputs a pulse signal as they rotates. The crank angle sensor 16 acquires the rotation angle from the rotation reference by counting the pulse signal from the rotation reference of the crankshaft 1 when the crankshaft 1 rotates. Similarly, the cam angle sensor 17 acquires the rotation angle from the rotation reference by counting the pulse signal from the rotation reference of the intake camshaft 7 when the intake camshaft 7 rotates.

With such a configuration, for example, by storing the count value of the crank angle sensor 16 and the count value of the cam angle sensor 17 when the drive case 21 and the internal rotor 22 are in a predetermined reference phase (for example, an intermediate phase), the relative rotation phase can be acquired by comparing the two types of count values regardless of whether the relative rotation phase changes from the reference phase to the advanced angle direction or the delayed angle direction.

The engine control device 40 constitutes the control unit Ab as an ECU that controls the engine E, and includes a phase control unit 41 and a regulation phase detection unit 42. The phase control unit 41 usually includes a normal phase control module 41a and a regulation phase maintenance control module 41b (an example of a regulation phase maintenance unit). The details of the control of the engine control device 40 will be described later.

[Valve Opening and Closing Timing Control Device: Operation Body]

As shown in FIG. 2, the operation body Aa has a configuration in which the drive case 21 (drive-side rotating body) and the internal rotor 22 (driven-side rotating body) are disposed coaxially with the rotation axis X of the intake camshaft 7, and includes the phase adjustment mechanism G that sets the relative rotation phase by the driving force of the phase control motor M.

The drive case 21 has the driving pulley 21S formed on the outer periphery thereof. The internal rotor 22 is housed in the drive case 21, and is connected and fixed to the intake camshaft 7 by a connection bolt 23. With this configuration, the internal rotor 22 is supported in a connected state to the intake camshaft 7, and the drive case 21 is relatively rotatably supported on the outer peripheral portion of the internal rotor 22.

The phase adjustment mechanism G is disposed between the drive case 21 and the internal rotor 22, and a front plate 24 is fastened by a plurality of fastening bolts 25 at the position at which the opening portion of the drive case 21 is covered. As a result, the displacement of the phase adjustment mechanism G and the internal rotor 22 in the direction along the rotation axis X is regulated by the front plate 24.

As shown in FIG. 1, the operation body Aa is entirely rotated in a driving rotation direction S by the driving force from the timing belt 6. Further, the driving force of the phase control motor M is transmitted to the internal rotor 22 via the phase adjustment mechanism G, so that the relative rotation phase of the internal rotor 22 with respect to the drive case 21 changes. Of the change, the change direction toward the same direction as the driving rotation direction S is referred to as an advanced angle direction Sa, and the opposite direction is referred to as a delayed angle direction Sb.

Figure 3:
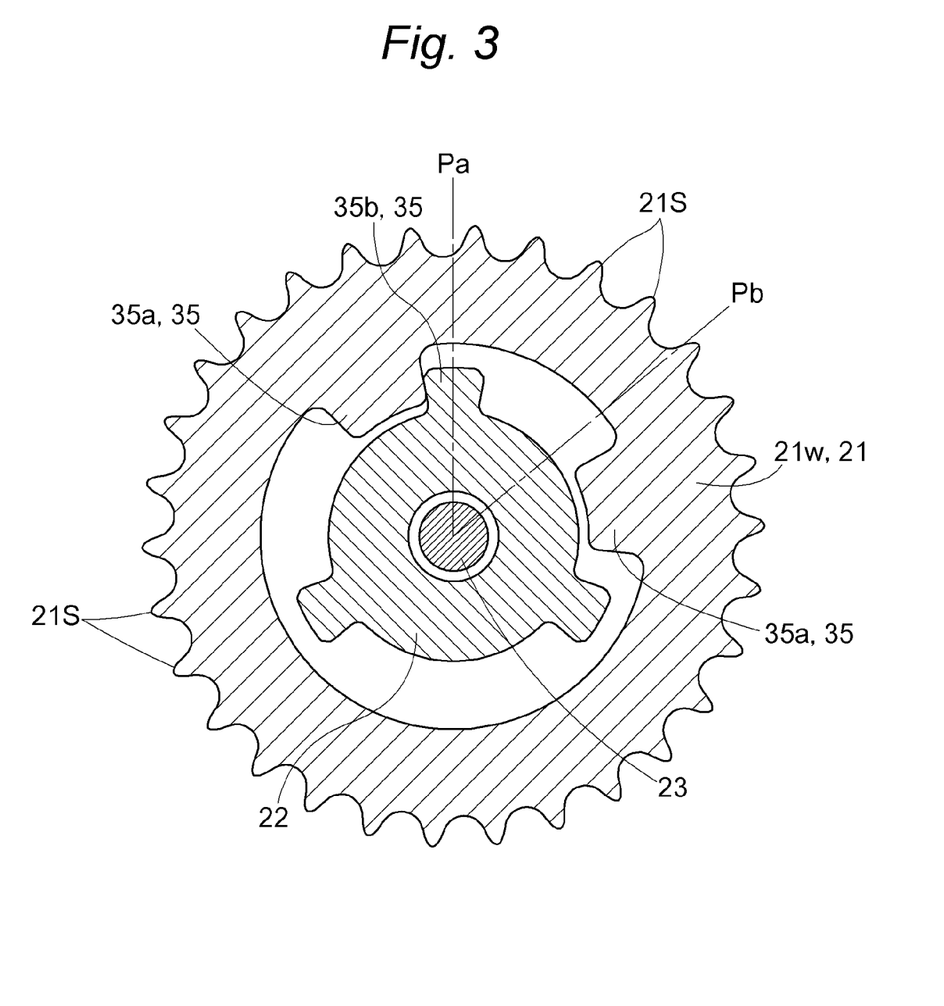
FIG. 3 is a sectional view taken along line III-III of FIG. 2.

In particular, as shown in FIG. 3, the operation body Aa includes a regulation unit 35 that sets a most advanced angle phase Pa (an example of the regulation phase) in which the relative rotation phase is mechanically limited in the advanced angle direction Sa, and a most delayed angle phase Pb (an example of the regulation phase) in which the relative rotation phase is mechanically limited in the delayed angle direction Sb.

The regulation unit 35 has a pair of regulation walls 35a formed, on the inner periphery of the opening of a wall portion 21w of the drive case 21 in a posture orthogonal to the rotation axis X, at positions separated in the circumferential direction centered on the rotation axis X, and a regulation protrusion 35b, of the internal rotor 22, that is located at a position at which the regulation protrusion 35b can be inserted into the opening of the wall portion 21w of the drive case 21, that contacts one of the regulation walls 35a when the relative rotation phase reaches the most advanced angle phase Pa, and that contacts the other regulation wall 35a when the relative rotation phase reaches the most delayed angle phase Pb.

[Valve Opening and Closing Timing Control Device: Phase Adjustment Mechanism]

As shown in FIG. 2, the phase adjustment mechanism G includes a ring gear 26 formed coaxially with the rotation axis X on the inner periphery of the internal rotor 22, an inner gear 27 that is rotatably disposed coaxially with an eccentric axis Y toward the inner periphery of the internal rotor 22, an eccentric cam body 28 disposed toward the inner periphery of the inner gear 27, the front plate 24, and a joint J. The eccentric axis Y is formed in a posture parallel to the rotation axis X.

The ring gear 26 has a plurality of inside teeth 26T, the inner gear 27 has a plurality of outside teeth 27T, and part of the outside teeth 27T is occluded with the inside teeth 26T of the ring gear 26. The phase adjustment mechanism G is configured as an inscribed planetary gear reducer in which the number of teeth of the outside teeth 27T of the inner gear 27 is smaller than the number of teeth of the inside teeth 26T of the ring gear 26 by one tooth.

The joint J is configured as an Oldham joint type in which the inner gear 27 and the drive case 21 are integrally rotated while maintaining the positional relationship in which the inner gear 27 is eccentric with respect to the drive case 21.

The eccentric cam body 28 has a tubular shape as a whole, and has a pair of engagement grooves 28B in a posture parallel to the rotation axis X with respect to the inner periphery. The eccentric cam body 28 is supported by a first bearing 31 with respect to the front plate 24 so as to rotate coaxially with the rotation axis X, and has an eccentric cam face 28A on the outer periphery of the portion toward the intake camshaft 7 relative to the support position.

The eccentric cam face 28A is formed in a circular shape (cross-sectional shape is circular) centered on the eccentric axis Y in a posture parallel to the rotation axis X. The inner gear 27 is rotatably supported by the eccentric cam face 28A via a second bearing 32. Further, a spring body 29 is fitted into the recess formed in the eccentric cam face 28A, and the urging force of the spring body 29 is applied to the inner gear 27 via the second bearing 32. With such a configuration, part of the outside teeth 27T of the inner gear 27 is occluded with part of the inside teeth 26T of the ring gear 26, and the occlusal state is maintained by the urging force of the spring body 29.

The phase control motor M is supported by the engine E, and the engagement pin 34 formed in the output shaft MS is fitted into the engagement groove 28B on the inner periphery of the eccentric cam body 28. Although details are not shown, the phase control motor M includes a rotor with a permanent magnet and a stator having a plurality of field coils disposed at a position surrounding the rotor, and is configured as a three-phase motor by providing the output shaft MS to which the rotation of the rotor is transmitted.

Further, to explain in the situation where the engine E is stopped, in the phase adjustment mechanism G, when the eccentric cam body 28 rotates about the rotation axis X as the output shaft MS rotates due to the drive of the phase control motor M, the inner gear 27 and the ring gear 26 are relatively rotated by an angle corresponding to the difference in the number of teeth every time the inner gear 27 makes one revolution. The relative rotation direction is opposite to the rotation direction of the output shaft MS. As a result, the drive case 21 that integrally rotates with the inner gear 27 via the joint J, and the intake camshaft 7 connected to the ring gear 26 by the connection bolt 23 are rotated relative to each other to achieve the valve timing adjustment.

In this valve opening and closing timing control device A, when the engine E is running, the relative rotation phase of the valve opening and closing timing control device A is maintained by driving and rotating the output shaft MS in the driving rotation direction S at the same speed as the intake camshaft 7. Since the phase adjustment mechanism G changes the relative rotation phase in the direction opposite to the rotation direction of the output shaft MS, it reduces the rotation speed of the output shaft MS when changing the relative rotation phase in the advanced angle direction Sa, and performs control to increase the rotation speed of the output shaft MS when changing the relative rotation phase in the delayed angle direction Sb.

[Control Configuration]

As shown in FIG. 1, the engine control device 40 receives detection signals from the crank angle sensor 16, the cam angle sensor 17, a current sensor 45, a temperature sensor 46, and an oil temperature sensor 47. The engine control device 40 can acquire the correction information of a correction table 48 to output a control signal to a control board 44 (an example of the motor control unit) that controls the phase control motor M.

The current sensor 45 detects the current supplied to the phase control motor M, and the temperature sensor 46 detects the temperature of the control board 44. The control board 44 includes a power control element that controls the current supplied to the coil of the phase control motor M, and the temperature sensor 46 detects a temperature increase in the atmosphere around the control board 44 due to heat due to an increase in the current supplied to the phase control motor M.

The oil temperature sensor 47 detects the oil temperature of the lubricating oil of engine E, and the correction table 48 is configured in the non-volatile storage like an EEPROM, and is stored in a manner of a table recording the correction information that determines the relationship between the oil temperature and the regulation maintenance current to be supplied when supplying the regulation maintenance current described later. Since the phase control motor M is configured as a three-phase motor as described above, the control board 44 generates a three-phase alternating current, and is configured so that the supply current can be arbitrarily set by setting the duty ratio.

The configuration is such that the lubricating oil of the engine E is supplied to the inside of the operation body Aa of the valve opening and closing timing control device A. When the oil temperature is low the viscosity of the lubricating oil is high, and it is necessary to make a correction that increases the current supplied to the phase control motor M when performing phase control and reduces the current supplied to the phase control motor M as the oil temperature increases. For this reason, the correction table is configured so as to make the regulation maintenance current supplied to the phase control motor M appropriate based on the detected oil temperature detected by the oil temperature sensor 47.

Specifically, the current value detected by the current sensor 45 is referred to as a "detection current", and the relative rotation phase detected by the phase sensor PS is referred to as an "actual phase".

The normal phase control module 41a of the phase control unit 41 drives the phase control motor M so that the actual phase detected by the phase sensor PS (crank angle sensor 16, cam angle sensor 17) matches the target phase. Under this control, the speed of change in the relative rotation phase is set based on the deviation between the actual phase and the target phase detected by the phase sensor PS, and the control under which the phase control motor M is driven at high speed (step #103 in FIG. 4) is realized by increasing the current supplied to the phase control motor M when the speed of change decreases.

Further, even when the regulation phase maintenance control module 41b of the phase control unit 41 sets the relative rotation phase as either the most advanced angle phase Pa or the most delayed angle phase Pb, the control (step #200 in FIG. 4 and the regulation phase maintenance control shown in FIG. 5) under which it is maintained at a phase in which the regulation unit 35 regulates the change of the relative rotation phase by using the driving force of the phase control motor M, is realized.

As shown in FIG. 3, the regulation phase detection unit 42 detects the state in which the relative rotation phase reaches the most advanced angle phase Pa (the limit of the advanced angle direction Sa regulated by the regulation unit 35) and the state in which the relative rotation phase reaches the most delayed angle phase Pb (the limit of the delayed angle direction Sb regulated by the regulation unit 35).

The phase control unit 41 and the regulation phase detection unit 42 described above are configured as software, but part of each unit can also be configured by hardware.

[Control Mode]

Figure 4:
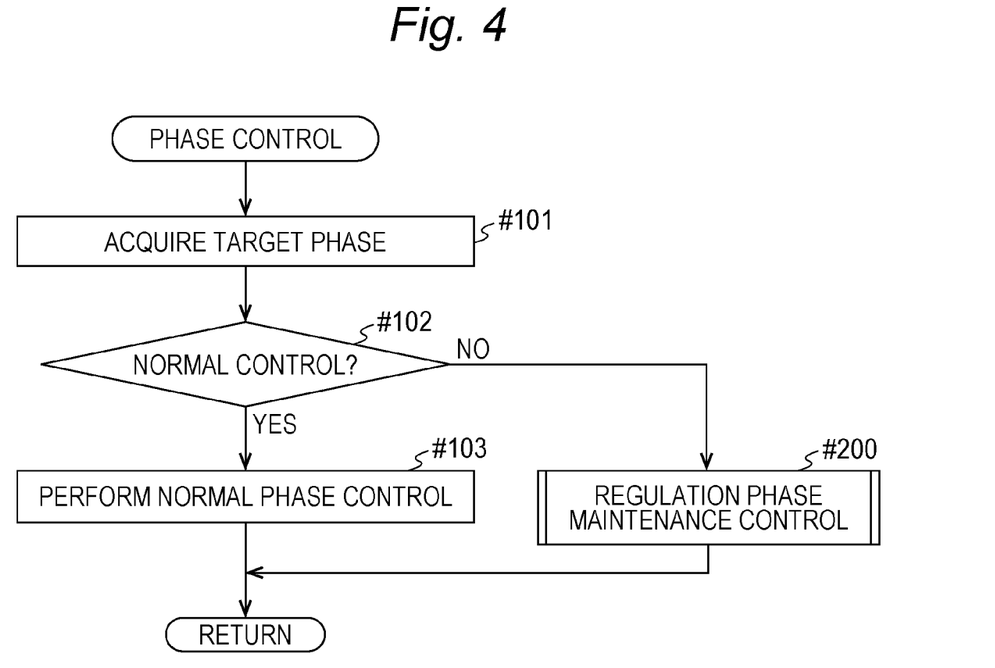
FIG. 4 is a flowchart of phase control.
Figure 7:
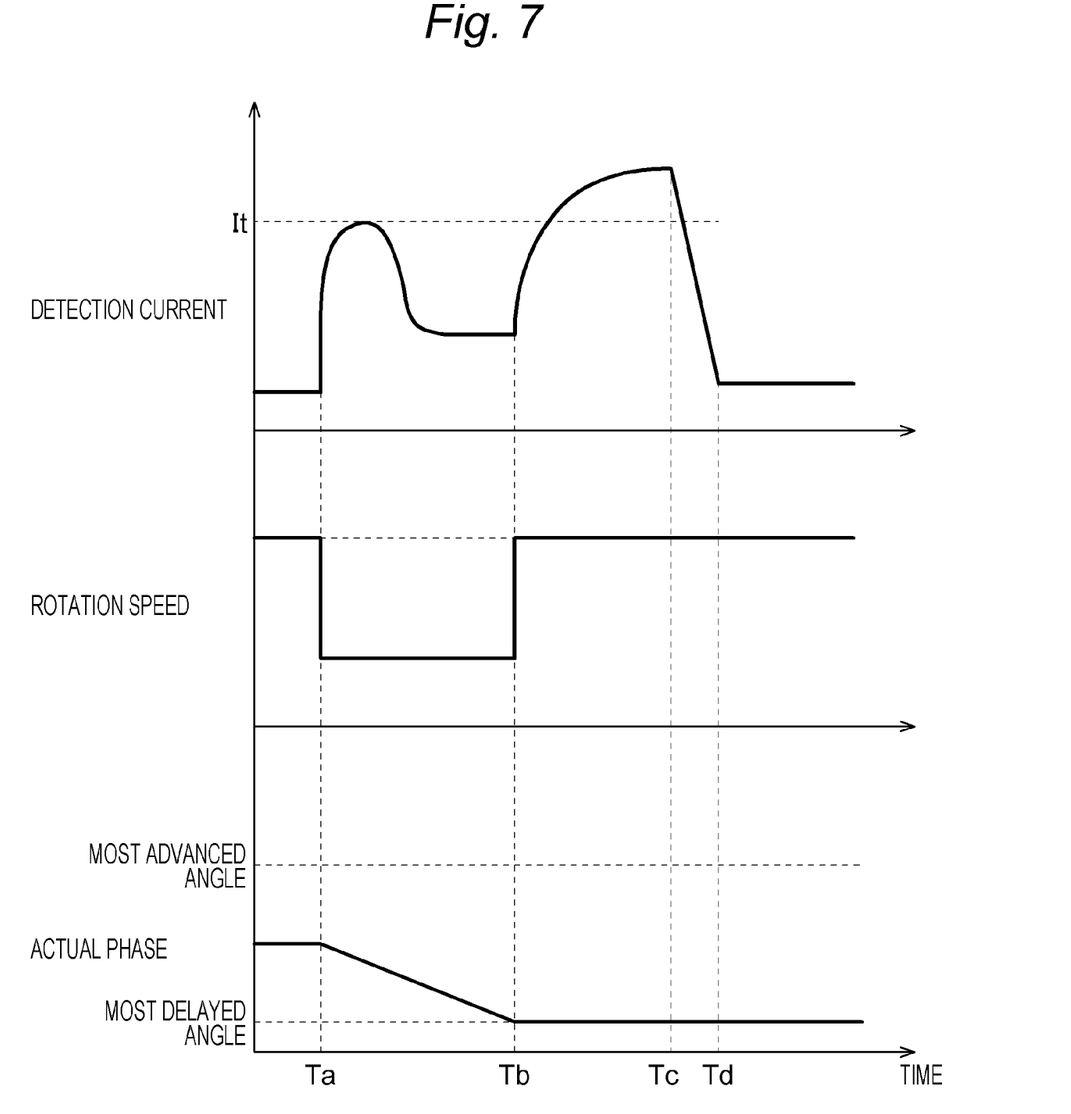
FIG. 7 is a timing chart which shows the current change, the rotation speed change, and the relative rotation phase change.

The control mode of the phase control of the operation body Aa of the valve opening and closing timing control device A by the engine control device 40 is shown in the flowchart of FIG. 4, and the detection current during this control (current value detected by the current sensor 45), the rotation speed of the phase control motor M, and the relative rotation phase detected by the phase sensor PS are shown in the timing chart of FIG. 7.

In the phase control shown in the flowchart of FIG. 4, since normal control is performed when the target phase is not the most advanced angle phase Pa or the most delayed angle phase Pb (Yes in step #102) when the target phase is acquired, the phase control motor M is controlled so that the actual phase detected by the phase sensor PS matches the target phase (steps #101 to #103).

On the contrary, when the target phase is the most advanced angle phase Pa or the most delayed angle phase Pb (No in #102 step), the regulation phase maintenance control (#200 step) under which the regulation protrusion 35b is pressed against the regulation wall 35a of the regulation unit 35 by the driving force of the phase control motor M is performed.

The timing at which this regulation phase maintenance control (#200 step) is started is control start timing Ta in FIG. 7. This regulation phase maintenance control (#200 step) is set as a subroutine, and in the present embodiment, a specific control mode when maintaining the relative rotation phase at the most delayed angle phase Pb (explained as the target regulation phase in the flowchart) is shown.

Figure 5:
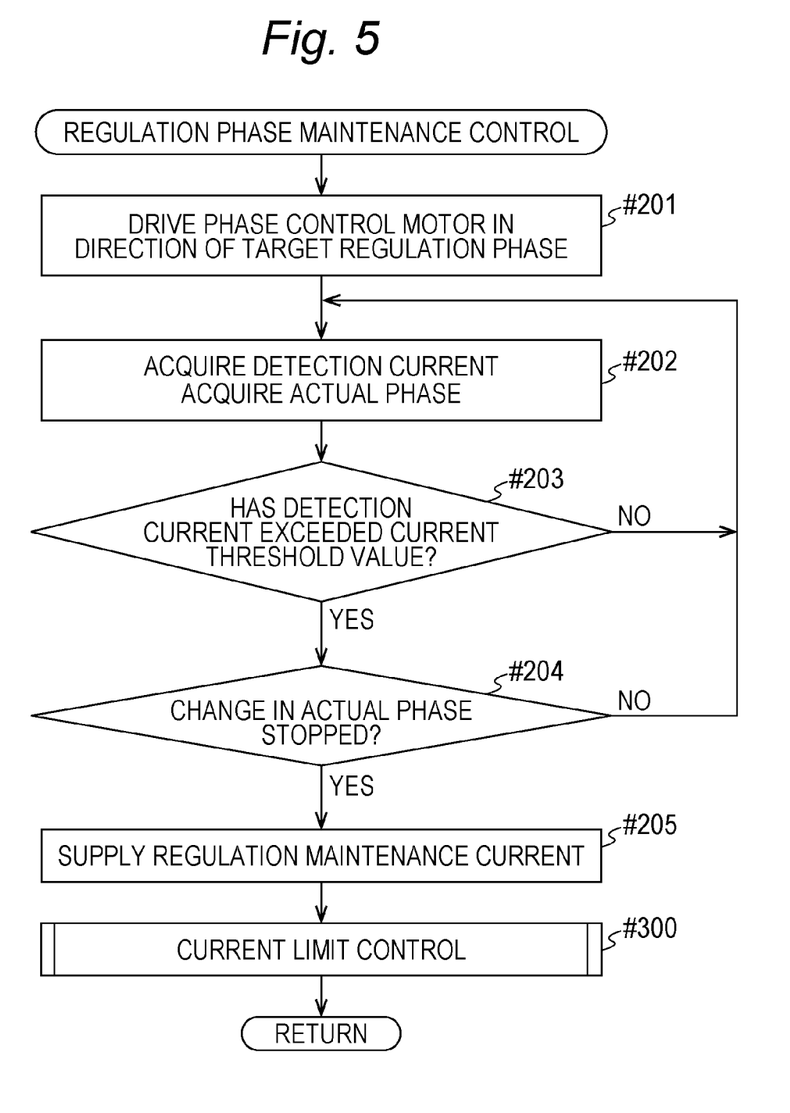
FIG. 5 is a flowchart of regulation phase maintenance control.

As shown in the flowchart of FIG. 5, in the regulation phase maintenance control (#200 step), after control start timing Ta shown in FIG. 7, the phase control motor M is driven in the direction of the target regulation phase to acquire the detection current (current value detected by the current sensor 45) and acquire the actual phase (relative rotation phase detected by the phase sensor PS), and it is determined whether the detection current exceeds the current threshold value It and the actual phase reaches the target regulation phase (most delayed angle) (steps #201 to #204).

The control in steps #201 to #204 is controlled by the regulation phase detection unit 42, and the regulation phase detection unit 42 has a basic control mode set so that the actual phase at the timing when the detection current increases is the regulation phase. In this control, the regulation phase is the target regulation phase.

The operation body Aa of the valve opening and closing timing control device A, changes the relative phase by selecting the acceleration and deceleration of the phase control motor M, and under this control, the phase control unit 41 sets the target speed of the phase control motor M based on the deviation between the actual phase and the target phase. The same control is performed when any of the most delayed angle phase Pb and the most advanced angle phase Pa are detected, and particularly when the phase control motor M is decelerated to detect the most advanced angle phase Pa, the deviation does not decrease even after reaching the regulation phase, so that the phase control motor M continues decelerating, and after that, starts the rotation in the opposite direction and increases the speed. As a result, as in the case where detecting the most delayed angle phase Pb, the detection current when the regulation protrusion 35b is pressed against the regulation wall 35a of the regulation unit 35 increases, and the detection of the most advanced angle movement Pa is realized based on this increase in the detection current.

In other words, as shown in FIG. 7, although the detection current may reach the current threshold value It at the timing when the phase control motor M is started at control start timing Ta, the actual phase continues to change (No in step #204 in the flowchart in FIG. 5), so that even when the detection current temporarily increases, the timing of this increase is not determined to be the regulation phase.

After that, when pressing timing Tb at which the regulation protrusion 35b presses against the regulation wall 35a is reached, as the load acting on the phase control motor M increases without changing the actual phase (Yes in step #204), the detection current (current value detected by the current sensor 45) exceeds the current threshold value It. As shown in FIG. 7, although the rotation speed of the phase control motor M changes from control start timing Ta until the relative rotation phase reaches the most delayed angle phase Pb, the rotation speed of the phase control motor M will rotate at a speed (half the rotation speed of the engine E) synchronized with the rotation speed of the engine E before control start timing Ta is reached and after the most delayed angle phase Pb is reached.

Since it can be determined that the actual phase has reached the target regulation phase (most delayed angle phase Pb) when this state is reached, the current reduction is started at current reduction timing Tc at which the predetermined time has passed, and the current reduction is started, and the regulation maintenance current is supplied to the phase control motor M at current maintenance timing Td (step #205 in the flowchart in FIG. 5). The regulation maintenance current supplied at current maintenance timing Td is set by referring to the correction table 48 based on the detected oil temperature detected by the oil temperature sensor 47, and after that, the current limit control (#300 step) is performed.

In step #205, the regulation maintenance current is supplied to the phase control motor M to press the regulation protrusion 35b against the regulation wall 35a with an appropriate pressure to maintain the most delayed angle phase Pb. When supplying the regulation maintenance current, the regulation maintenance current with a highly accurate value can be supplied by considering the back electromotive force of the phase control motor M. In addition, the current limit control (#300 step) is set as a subroutine, and when the detection temperature C (see FIG. 8) detected by the temperature sensor 46 increases in the state of supplying the regulation maintenance current, it functions to protect the control board 44 and the phase control motor M by limiting the supply of current.

Figure 8:
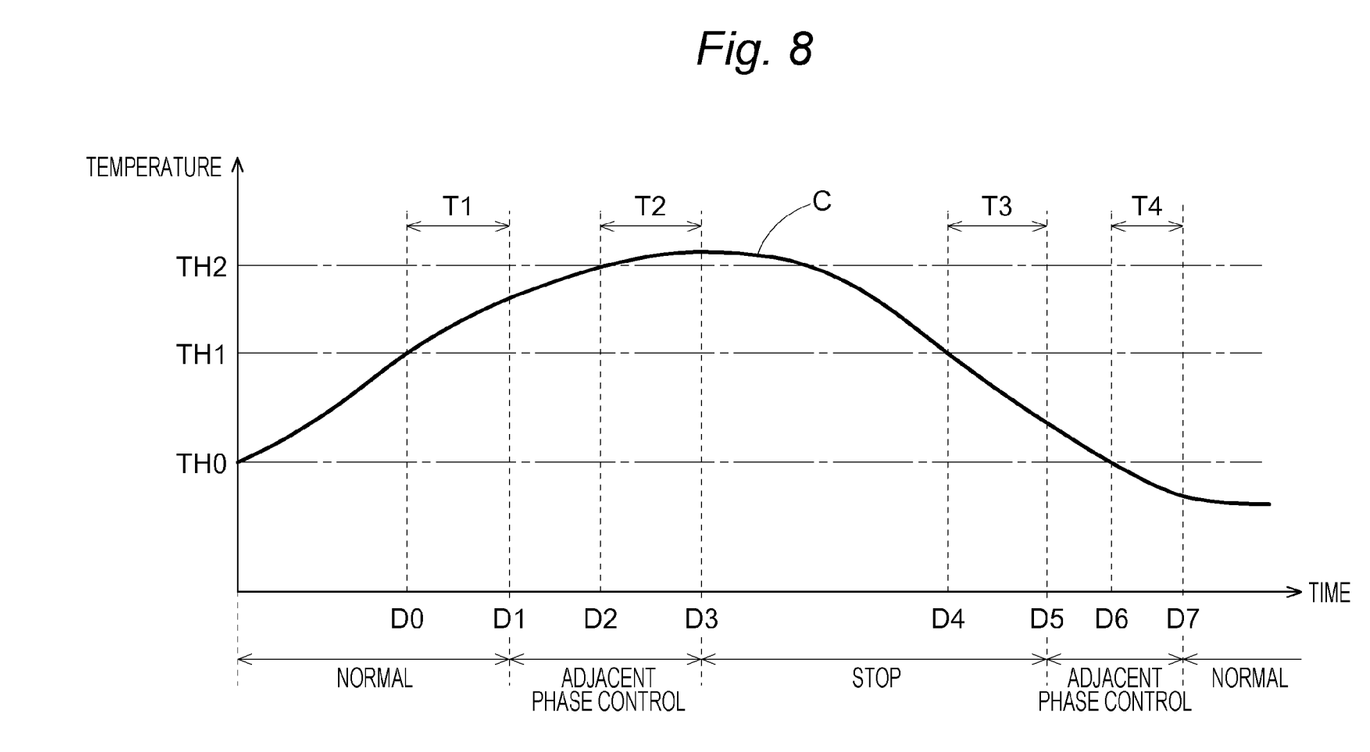
FIG. 8 is a graph which shows the relationship between change in temperature and control.

The control mode of the current limit control (#300 step) can be explained corresponding to the detection temperature C appearing as shown in the graph shown in FIG. 8. In the graph of FIG. 8, the detection temperature C of the temperature sensor 46 is on the vertical axis, and the passage of time is on the horizontal axis.

In other words, in current limit control, a return threshold value TH0, a release threshold value TH1 (an example of the first set temperature), and a stop threshold value TH2 (an example of the second set temperature) are set, and as shown in the graph of FIG. 8, when the detection temperature C changes, control is set at determination timings of D1 to D7, and the switching of this control is indicated by the elapsed times T1 to T4.

Figure 6:
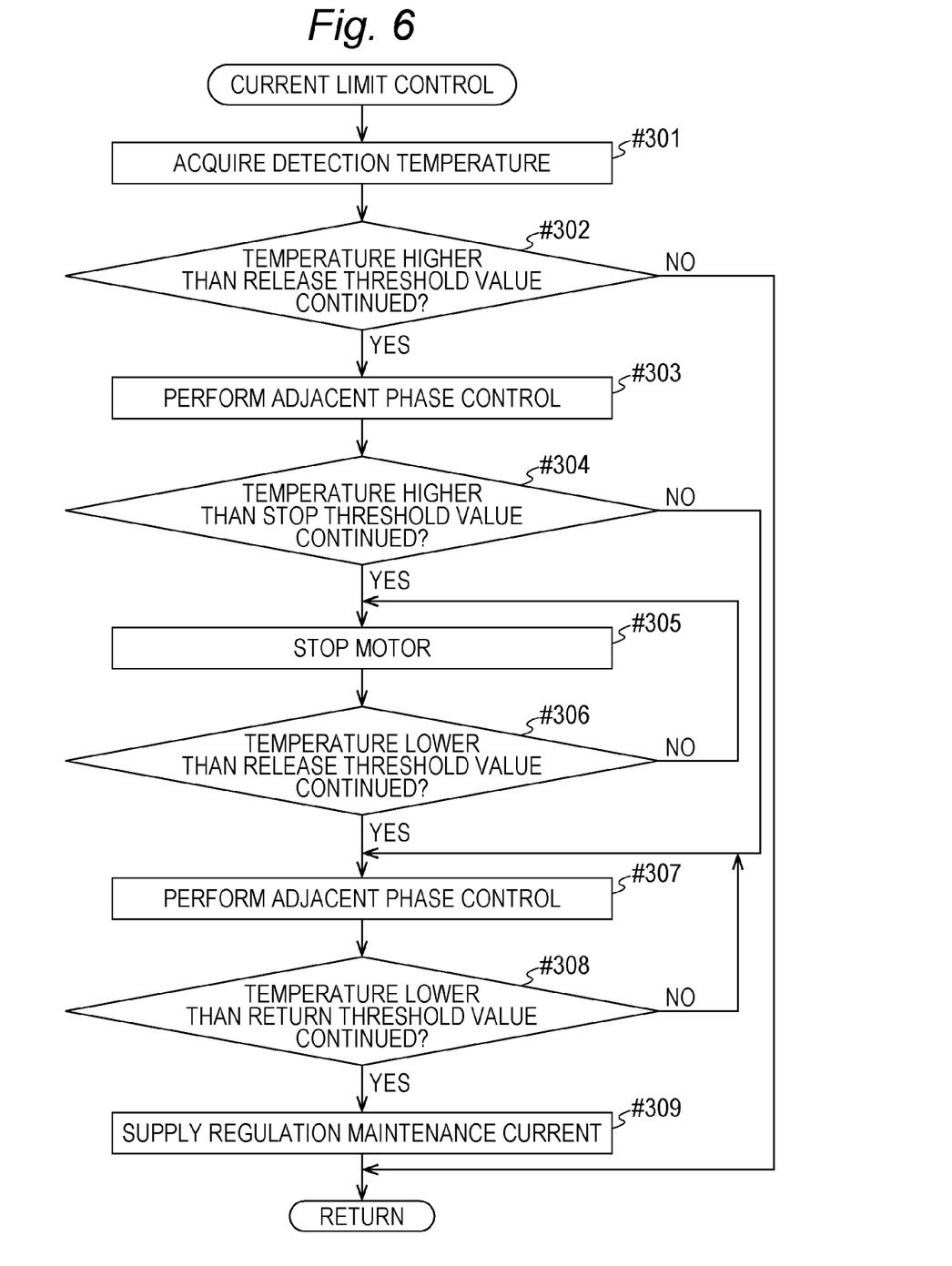
FIG. 6 is a flowchart of current limit control.

As shown in the flowchart of FIG. 6, in the current limit control (#300 step), the detection temperature C is acquired by the temperature sensor 46, and when the high temperature state in which the detection temperature C is higher than the release threshold value TH1 (see FIG. 8) continues for the elapsed time T1 (Yes in step #302), the process proceeds to the adjacent phase control under which the relative rotation phase is maintained at the adjacent phase immediately before the regulation wall 35a and the regulation protrusion 35b come into contact with each other (steps #301 to #303).

It is possible to release the state in which the regulation protrusion 35b is pressed against the regulation wall 35a by performing the adjacent phase control in this way. When it is determined in step #302 that the high temperature state does not continue (No in step #302 step), the control of this current limit control (step #300) is exited and the process returns.

Referring to FIG. 8 for the control in steps #301 to #303, the detection temperature C is higher than the release threshold value TH1 at the determination timing D0, and the process proceeds to the adjacent phase control under which the relative rotation phase is maintained at the adjacent phase immediately before the regulation wall 35a and the regulation protrusion 35b come into contact with each other at timing D1 when this high temperature state has continued for the elapsed time T1, the relative rotation phase. As a result, it is possible to release the state in which the regulation protrusion 35b is pressed against the regulation wall 35a. As a result, the load acting on the phase control motor M is reduced while maintaining the most delayed angle phase Pb, and the temperature of the control board 44 and the phase control motor M can be lowered.

Next, the high temperature state in which the detection temperature C is higher than the stop threshold value TH2 (see FIG. 8) continues for the elapsed time T2 in the situation where the adjacent phase control is performed (Yes in #304 step), the current supplied to the phase control motor M is stopped to stop the phase control motor M (steps #304 and #305). Also, when the detection temperature C is not higher than the stop threshold value TH2 in step #304, or when the high temperature state does not continue even when the detection temperature C is higher than the stop threshold value TH2 (No in #304 step), the process proceeds to the control in step #307. In this #307 step, the adjacent phase control is performed in the same manner as in the #303 step described above.

With reference to FIG. 8 for the control in steps #304 and #305, the detection temperature C is higher than the stop threshold value TH2 at determination timing D2, and the current supplied to the phase control motor M is stopped at determination timing D3 when this high temperature state has continued for the elapsed time T2. Since the load acting on the phase control motor M is large and the temperature of the control board 44 is increasing in a situation where the detection temperature C is higher than the stop threshold value TH2, heat dissipation from the control board 44 and the phase control motor M is promoted by completely stopping the phase control motor M. At this time, since the force for pressing the regulation protrusion 35b against the regulation wall 35a does not act, the relative rotation phase (actual phase) can change from the most delayed angle phase Pb to the advanced angle direction Sa.

Next, when the low temperature state in which the detection temperature C is lower than the release threshold value TH1 (see FIG. 8) continues for the elapsed time T3 (Yes in step #306), the process proceeds to the adjacent phase control under which the relative rotation phase is maintained at the adjacent phase immediately before the regulation wall 35a and the regulation protrusion 35b come into contact with each other (steps #306 and #307). Also, when the detection temperature C is not lower than the release threshold value TH1 in step #306, or when the low temperature state does not continue even when the detection temperature C is lower than the release threshold value TH1 (No in #306 step), the process proceeds to the control in #305 step. As a result, even when the relative rotation phase (actual phase) changes in the advanced angle direction Sa from the most delayed angle phase Pb, it changes to the most delayed angle phase Pb again.

Referring to FIG. 8 for the control in steps #306 and #307, the detection temperature C is lower than the release threshold value TH1 at determination timing D4, the process proceeds to the adjacent phase control under which the relative rotation phase is maintained at the adjacent phase immediately before the regulation wall 35a and the regulation protrusion 35b come into contact with each other at determination timing D5 when this low temperature state has continued for the elapsed time T3, and the relative rotation phase is maintained at the most delayed angle phase Pb.

Next, when the low temperature state in which the detection temperature C is lower than the return threshold value TH0 (see FIG. 8) continues for the elapsed time T4 (Yes in step #308), the regulation maintenance current having the same value as the regulation maintenance current set in step #205 of the regulation maintenance routine (step #200) is supplied to the phase control motor M (step #309). Also, when the temperature is not lower than the return threshold value TH0 in step #308, or when the low temperature state does not continue even when the temperature is lower than the return threshold value TH0 (No in #308 step), the control in #307 step continues.

When supplying the regulation maintenance current, the regulation maintenance current set by referring to the correction table 48 based on the detected oil temperature detected by the oil temperature sensor 47 as described above in step #205 is supplied.

With reference to FIG. 8 for the control in steps #308 and #309, the regulation maintenance current is supplied at the determination timing D7 when the low temperature state in which the detection temperature C is lower than the return threshold value TH0 at determination timing D6 has continued for the elapsed time T4. By supplying the regulation maintenance current in this way, the state returns to the state in which the regulation protrusion 35b is pressed against the regulation wall 35a with an appropriate pressure, and the most delayed angle phase Pb is maintained.

In the outline of this control, as shown in FIG. 8 when the detection temperature C changes, normal control under which the regulation maintenance current is supplied to the phase control motor M is performed in the region from the start of control in step #300 to determination timing D1, and the adjacent phase control under which the relative rotation phase is maintained in the region between the determination timings D1 and D3 at the adjacent phase immediately before the regulation wall 35a and the regulation protrusion 35b come into contact with each other is performed.

After that, the stop control under which the phase control motor M is stopped in the region between determination timings D3 and D5 is performed, and the adjacent phase control under which the relative rotation phase is maintained in the region between the determination timings D5 and D7 at the adjacent phase immediately before the regulation wall 35a and the regulation protrusion 35b come into contact with each other is performed. Then, in the region after the determination timing D7, normal control under which the regulation maintenance current is supplied to the phase control motor M is performed.

Action and Effect of the Embodiment

In this way, the regulation wall 35a of the regulation unit 35 and the regulation protrusion 35b come into contact with each other regardless of whether the valve opening and closing timing control device A is set to any regulation phase of the most advanced angle phase Pa and the most delayed angle phase Pb, and the regulation phase detection unit 42 can accurately determine that the timing when the detection current increases to exceed the current threshold value Its is the time when the regulation phase (most advanced angle phase Pa, most delayed angle phase Pb) is reached.

In addition, after accurately determining the most advanced angle phase Pa and the most delayed angle phase Pb, the current supplied to the phase control motor M is reduced to the regulation maintenance current, so that any phases of the most advanced angle phase Pa and the most delayed angle phase Pb can be maintained with the regulation wall 35a and the regulation protrusion 35b pressed against each other without supplying unnecessary current to the phase control motor M.

In addition, in regulation phase maintenance control, in order to maintain the contact between the regulation wall 35a and the regulation protrusion 35b of the regulation unit 35 by the driving force of the phase control motor M, the phase control motor M is rotated at a speed slightly higher than the rotation speed of the operation body Aa of the valve opening and closing timing control device A, and although it may cause the temperature of the control board 44 and the phase control motor M to increase, the temperature increase is suppressed by controlling the current value supplied to the phase control motor M by current limit control to extend the life of the phase control motor M.

Other Embodiments

The present disclosure may be configured as follows in addition to the above-described embodiment (those having the same functions as those in the embodiment are designated by the same number and reference numeral as those in the embodiment).

Figure 9:
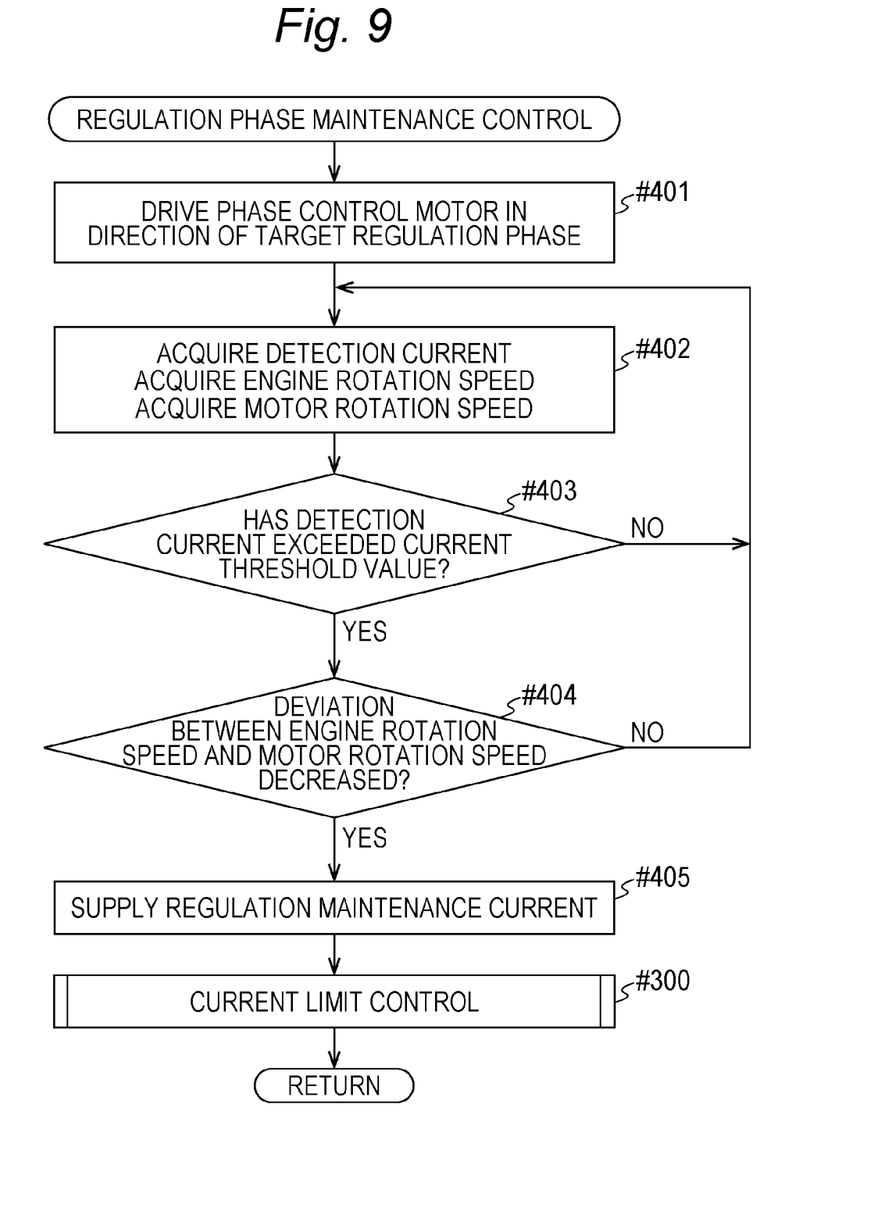
FIG. 9 is a flowchart of the regulation phase maintenance control of another embodiment (a).

(a) The regulation phase maintenance control (step #200 in the flowchart of #4) is configured as steps #401 to #405 in FIG. 9. In other words, after control start timing Ta (see FIG. 7), the phase control motor M is driven in the direction of the target regulation phase, the detection current (current detected by the current sensor 45) is acquired, the rotation speed of engine E per unit time is acquired as the engine rotation speed, the rotation speed of the phase control motor M per unit time is acquired as the motor rotation speed, and it is determined whether the detection current exceeds the current threshold value It (see FIG. 7) and the deviation between the engine rotation speed and the motor rotation speed is reduced below the set value (steps #401 to #404).

The control in steps #401 to #404 is the control by the regulation phase detection unit 42, and the regulation phase detection unit 42 sets the actual phase at the timing when Yes is determined in step #404 as the regulation phase. The process proceeds to the control under which the regulation maintenance current set in this way is supplied to the phase control motor M (#405 step), and the current limit control (#300 step) shown in FIG. 6 is performed.

In this another embodiment (a), as in step #405, the regulation protrusion 35b is pressed against the regulation wall 35a with an appropriate pressure by supplying the regulation maintenance current to the phase control motor M to maintain either phase of the most delayed angle phase Pb or the most advanced angle phase Pa. When supplying the regulation maintenance current in this way, the regulation maintenance current with a highly accurate value can be supplied by considering the back electromotive force of the phase control motor M.

(b) For example, the operation body Aa of the valve opening and closing timing control device A learns and stores the detection value of the phase sensor PS when the most advanced angle phase Pa and the most delayed angle phase Pb are set, and after learning and storing the value, when setting the relative rotation phase within the range of the most advanced angle phase Pa and the most delayed angle phase Pb, the phase control motor M is not unnecessarily driven, and current is not wasted.

By performing learning and storing as in this another embodiment (b), even when there is a variation in the phase between the most advanced angle phase Pa and the most delayed angle phase Pb due to a manufacturing error of the operation body Aa of the valve opening and closing timing control device A, it is possible to perform efficient control under which the phases of the most advanced angle phase Pa and the most delayed angle phase Pb can be accurately learned and stored.

(c) The control mode of the current limit control is not limited to that described in the embodiment, but for example, the power supplied to the phase control motor M may be cut off at the timing when the detection temperature of the temperature sensor 46 reaches a preset threshold value. Similarly, it is conceivable to set the control mode so that the detection temperature and the current are inversely proportional to each other so that the current supplied to the phase control motor M is reduced as the detection temperature of the temperature sensor 46 increases.

The feature configuration of the valve opening and closing timing control device according to the present disclosure includes a drive-side rotating body that is rotatable around a rotation axis, and that rotates synchronously with a crankshaft of an internal combustion engine, a driven-side rotating body that is rotatable around the rotation axis, and that integrally rotates with a camshaft for opening and closing a valve of the internal combustion engine, an electric motor that controls a relative rotation phase of the drive-side rotating body and the driven-side rotating body, a motor control unit that controls a current supplied to the electric motor, a current sensor that detects the current flowing into the electric motor, a regulation unit that determines a regulation phase in which the relative rotation phase is mechanically limited in an advanced angle direction and in a delayed angle direction, and a regulation phase detection unit that detects the regulation phase based on when the relative rotation phase in which a change is stopped by the regulation unit is reached and a current value detected by the current sensor increases when controlling the relative rotation phase with the electric motor.

According to this feature configuration, the relative rotation phase is changed, for example, in the advanced angle direction by the driving force of the electric motor, and when the relative rotation phase in which this change is stopped by the regulation unit is the most advanced angle phase, the current flowing into the electric motor increases as the load increases at the timing when the change in the relative rotation phase is stopped in this way. Similarly, when the relative rotation phase reaches the most delayed angle phase due to the driving force of the electric motor, the current flowing into the electric motor increases. By utilizing such a phenomenon, it is possible to determine the most advanced angle phase and the most delayed angle phase based on the current detected by the current sensor.

Therefore, the valve opening and closing timing control device capable of appropriately detecting the most advanced angle phase and the most delayed angle phase is configured.

As a configuration in addition to the above configuration, the valve opening and closing timing control device may include a phase sensor that detects the relative rotation phase, wherein the regulation phase detection unit may detect, in control under which the relative rotation phase is changed from a phase which is out of the regulation phase toward the regulation phase, the regulation phase based on timing at which the relative rotation phase detected by the phase sensor reaches the relative rotation phase in which a change is stopped by the regulation unit, and a current detected by the current sensor increases.

According to this, since the regulation phase is detected based on two conditions, the phenomenon in which the change in the relative rotation phase detected by the phase sensor stops when the relative rotation phase reaches the regulation phase, and the timing when the current sensor increases, the detection accuracy of the regulation phase is improved.

As a configuration added to the above configuration, the regulation maintenance current may be set based on an increased current value detected by the current sensor, and a deviation between a rotation speed of the internal combustion engine and a rotation speed of the electric motor.

According to this, when the relative rotation phase reaches the regulation phase by driving the electric motor, as the load acting on the electric motor increases, the current supplied to the electric motor increases, and at the same time, the rotation speed of the electric motor decreases and the deviation from the rotation speed of the internal combustion engine is reduced. Therefore, the detection accuracy of the regulation phase is improved because the detection is performed based on the increase in the current value and the reduction in the deviation.

As a configuration in addition to the above configuration, the valve opening and closing timing control device may include a regulation phase maintenance unit that maintains the relative rotation phase at the regulation phase by setting a regulation maintenance current after the regulation phase detection unit detects that the relative rotation phase has reached the regulation phase, and supplying the regulation maintenance current to the electric motor.

According to this, it is possible to maintain the regulation state by supplying the regulation maintenance current to the electric motor while the relative rotation phase is in the regulation phase. By, for example, setting the value of the regulation maintenance current required for maintaining the mechanical limit in the regulation unit as the regulation maintenance current, wasteful consumption of electric power is reduced and the life of the electric motor is extended.

As a configuration in addition to the above configuration, the regulation maintenance current may be set based on the back electromotive force of the electric motor.

Since the voltage of the back electromotive force generated by the rotation of the rotor of the electric motor acts in the direction opposite to the direction in which the voltage of the power supply is applied, it is possible to supply the required regulation maintenance current to the electric motor by supplying a current having a value in consideration of the back electromotive force, and the relative rotation phase can be maintained at the regulation phase.

As a configuration in addition to the above configuration, the valve opening and closing timing control device may include an oil temperature sensor that detects an oil temperature of lubricating oil supplied to the drive-side rotating body and the driven-side rotating body, wherein the regulation maintenance current is set based on an oil temperature of lubricating oil detected by the oil temperature sensor.

Lubricating oil is more viscous as the temperature drops, and even when the regulation maintenance current having the set value is supplied to the electric motor, it may not be possible to obtain the force required to maintain the relative rotation phase due to the viscosity of the lubricating oil in the regulation unit. For this reason, the relative rotation phase can be maintained at the regulation phase by supplying the regulation maintenance current in consideration of the viscosity of the lubricating oil based on the oil temperature detected by the oil temperature sensor.

As a configuration in addition to the above configuration, the motor control unit may include a temperature sensor that detects a temperature of a control board when controlling a current supplied to the electric motor, wherein the regulation phase maintenance unit performs adjacent phase control under which the relative rotation phase is maintained at an adjacent phase immediately before reaching the regulation phase when the temperature sensor detects a temperature that exceeds a first set temperature in control under which the regulation maintenance current is supplied.

According to this, it is possible to maintain the regulation state by supplying the regulation maintenance current to the electric motor while the relative rotation phase is in the regulation phase. In addition, by performing adjacent phase control under which the relative rotation phase is maintained at the adjacent phase immediately before reaching the regulation phase in a case where the temperature sensor detects a temperature that exceeds the first set temperature when the control under which the regulation state is maintained in this way continues, the inconvenience of supplying excessive current to the electric motor can be eliminated to reduce power waste and extend the life of the electric motor.

As a configuration in addition to the above configuration, the regulation phase maintenance unit may stop a supply of an electric current to the electric motor when the temperature sensor detects a temperature exceeding a second set temperature set to be higher than the first set temperature.

According to this, the inconvenience that an excessive current is supplied to the electric motor can be eliminated.

The present disclosure can be used for a valve opening and closing timing control device that controls an opening/closing timing with an electric motor.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A valve opening and closing timing control device comprising:
   a drive-side rotating body that is rotatable around a rotation axis, and that rotates synchronously with a crankshaft of an internal combustion engine;
   a driven-side rotating body that is rotatable around the rotation axis, and that integrally rotates with a camshaft for opening and closing a valve of the internal combustion engine;
   an electric motor that controls a relative rotation phase of the drive-side rotating body and the driven-side rotating body;
   a motor control unit that controls a current supplied to the electric motor;
   a current sensor that detects the current flowing into the electric motor;
   a regulation unit that determines a regulation phase in which the relative rotation phase is mechanically limited in an advanced angle direction and in a delayed angle direction; and
   a regulation phase detection unit that detects the regulation phase based on when a change of the relative rotation phase is stopped by the regulation unit and a current value detected by the current sensor increases when controlling the relative rotation phase with the electric motor.

2. The valve opening and closing timing control device according to claim 1, further comprising:
   a phase sensor that detects the relative rotation phase, wherein
   the regulation phase detection unit detects, in control under which the relative rotation phase is changed from a phase which is out of the regulation phase toward the regulation phase, the regulation phase based on timing at which the relative rotation phase detected by the phase sensor reaches the relative rotation phase in which a change is stopped by the regulation unit, and a current detected by the current sensor increases.

3. The valve opening and closing timing control device according to claim 2, further comprising a regulation phase maintenance unit that maintains the relative rotation phase at the regulation phase by setting a regulation maintenance current after the regulation phase detection unit detects that the relative rotation phase has reached the regulation phase, and supplying the regulation maintenance current to the electric motor.

4. The valve opening and closing timing control device according to claim 3, wherein the regulation maintenance current is set based on a back electromotive force of the electric motor.

5. The valve opening and closing timing control device according to claim 3, further comprising: an oil temperature sensor that detects an oil temperature of lubricating oil supplied to the drive-side rotating body and the driven-side rotating body, wherein
   the regulation maintenance current is set based on the oil temperature of the lubricating oil detected by the oil temperature sensor.

6. The valve opening and closing timing control device according to claim 3, wherein
   the motor control unit includes a temperature sensor that detects a temperature of a control board when controlling a current supplied to the electric motor, and
   the regulation phase maintenance unit performs adjacent phase control under which the relative rotation phase is maintained at an adjacent phase immediately before reaching the regulation phase when the temperature sensor detects a temperature that exceeds a first set temperature in control under which the regulation maintenance current is supplied.

7. The valve opening and closing timing control device according to claim 6, wherein the regulation phase maintenance unit stops a supply of an electric current to the electric motor when the temperature sensor detects a temperature exceeding a second set temperature set to be higher than the first set temperature.

8. The valve opening and closing timing control device according to claim 1, wherein the regulation phase detection unit detects the regulation phase based on an increased current value detected by the current sensor, and a deviation between a rotation speed of the internal combustion engine and a rotation speed of the electric motor.

9. The valve opening and closing timing control device according to claim 8, further comprising a regulation phase maintenance unit that maintains the relative rotation phase at the regulation phase by setting a regulation maintenance current after the regulation phase detection unit detects that the relative rotation phase has reached the regulation phase, and supplying the regulation maintenance current to the electric motor.

10. The valve opening and closing timing control device according to claim 9, wherein the regulation maintenance current is set based on a back electromotive force of the electric motor.

11. The valve opening and closing timing control device according to claim 9, further comprising: an oil temperature sensor that detects an oil temperature of lubricating oil supplied to the drive-side rotating body and the driven-side rotating body, wherein
the regulation maintenance current is set based on the oil temperature of the lubricating oil detected by the oil temperature sensor.

12. The valve opening and closing timing control device according to claim 9, wherein
the motor control unit includes a temperature sensor that detects a temperature of a control board when controlling a current supplied to the electric motor, and
the regulation phase maintenance unit performs adjacent phase control under which the relative rotation phase is maintained at an adjacent phase immediately before reaching the regulation phase when the temperature sensor detects a temperature that exceeds a first set temperature in control under which the regulation maintenance current is supplied.

13. The valve opening and closing timing control device according to claim 12, wherein the regulation phase maintenance unit stops a supply of an electric current to the electric motor when the temperature sensor detects a temperature exceeding a second set temperature set to be higher than the first set temperature.

14. The valve opening and closing timing control device according to claim 1, further comprising a regulation phase maintenance unit that maintains the relative rotation phase at the regulation phase by setting a regulation maintenance current after the regulation phase detection unit detects that the relative rotation phase has reached the regulation phase, and supplying the regulation maintenance current to the electric motor.

15. The valve opening and closing timing control device according to claim 14, wherein the regulation maintenance current is set based on a back electromotive force of the electric motor.

16. The valve opening and closing timing control device according to claim 14, further comprising: an oil temperature sensor that detects an oil temperature of lubricating oil supplied to the drive-side rotating body and the driven-side rotating body, wherein
the regulation maintenance current is set based on the oil temperature of the lubricating oil detected by the oil temperature sensor.

17. The valve opening and closing timing control device according to claim 14, wherein
the motor control unit includes a temperature sensor that detects a temperature of a control board when controlling a current supplied to the electric motor, and
the regulation phase maintenance unit performs adjacent phase control under which the relative rotation phase is maintained at an adjacent phase immediately before reaching the regulation phase when the temperature sensor detects a temperature that exceeds a first set temperature in control under which the regulation maintenance current is supplied.

18. The valve opening and closing timing control device according to claim 17, wherein the regulation phase maintenance unit stops a supply of an electric current to the electric motor when the temperature sensor detects a temperature exceeding a second set temperature set to be higher than the first set temperature.

* * * * *